(12) United States Patent
Ouyang et al.

(10) Patent No.: US 11,807,540 B2
(45) Date of Patent: Nov. 7, 2023

(54) METHOD FOR PREPARING LITHIUM BOROHYDRIDE BY MEANS OF SOLID-PHASE BALL MILLING AT ROOM TEMPERATURE

(71) Applicant: South China University of Technology, Guangdong (CN)

(72) Inventors: Liuzhang Ouyang, Guangdong (CN); Kang Chen, Guangdong (CN); Hui Wang, Guangdong (CN); Jiangwen Liu, Guangdong (CN); Min Zhu, Guangdong (CN)

(73) Assignee: South China University of Technology

( * ) Notice: Subject to any disclaimer, the term of this patent is extended or adjusted under 35 U.S.C. 154(b) by 578 days.

(21) Appl. No.: 16/977,705

(22) PCT Filed: Oct. 30, 2018

(86) PCT No.: PCT/CN2018/112515
§ 371 (c)(1),
(2) Date: Sep. 2, 2020

(87) PCT Pub. No.: WO2019/174245
PCT Pub. Date: Sep. 19, 2019

(65) Prior Publication Data
US 2021/0039947 A1    Feb. 11, 2021

(30) Foreign Application Priority Data

Mar. 14, 2018  (CN) .......................... 201810210745.9

(51) Int. Cl.
*C01B 6/17* (2006.01)
(52) U.S. Cl.
CPC ............ *C01B 6/17* (2013.01); *C01P 2002/74* (2013.01); *C01P 2002/82* (2013.01); *C01P 2006/80* (2013.01)

(58) Field of Classification Search
CPC .. C01B 6/17; C01B 3/065; C01B 6/21; C01B 3/001; C01P 2002/74; C01P 2002/82;
(Continued)

(56) References Cited

U.S. PATENT DOCUMENTS 8,808,662 B2     8/2014  Allen et al.
2016/0368768 A1*  12/2016  Stout ...................... C01B 3/0026

FOREIGN PATENT DOCUMENTS

CN       101269793       9/2008
CN       101654223       2/2010
(Continued)

OTHER PUBLICATIONS

Bilen et al. "Synthesis of LiBH4 from LiBO2 as hydrogen carrier and its catalytic dehydrogenation" International Journal of Hydrogen Energy, vol. 40, Issue 44, Nov. 26, 2015, pp. 15213-15217 (Year: 2015).*

(Continued)

*Primary Examiner* — Steven J Bos
*Assistant Examiner* — Syed T Iqbal
(74) *Attorney, Agent, or Firm* — Lerner David LLP

(57) ABSTRACT

A method for preparing lithium borohydride by means of room temperature solid phase ball milling, comprising the following steps: uniformly mixing a magnesium-containing reducing agent and a lithium metaborate-containing reducing material under a non-oxidizing atmosphere at room temperature, performing solid phase ball milling, isolating and purifying to obtain lithium borohydride. The method has the advantages of having a simple process, having a controllable and adjustable reaction procedure, having mild reaction conditions, energy consumption being low, costs being low, and output being high, while creating no pollution, being safe and cyclically using boron resources, having important practical significance.

6 Claims, 13 Drawing Sheets

(58) Field of Classification Search
CPC .. C01P 2006/80; C01P 2002/72; Y02E 60/32; Y02E 60/36
See application file for complete search history.

(56) References Cited

FOREIGN PATENT DOCUMENTS

| | | |
|---|---|---|
| CN | 102219188 | 10/2011 |
| CN | 106477523 | 3/2017 |
| CN | 108285131 | 7/2018 |

OTHER PUBLICATIONS

Liu et al. "Sodium borohydride formation when Mg reacts with hydrous sodium borates under hydrogen" Journal of Alloys and Compounds 476 (2009) L16-L20 (Year: 2009).*
Written Opinion based on PCT International Application No. PCT/CN2018/112515, dated Jan. 18, 2019, 4 Pages.
International Search Report based on PCT International Application No. PCT/CN2018/112515, dated Jan. 18, 2019, 2 Pages.

* cited by examiner

METHOD FOR PREPARING LITHIUM BOROHYDRIDE BY MEANS OF SOLID-PHASE BALL MILLING AT ROOM TEMPERATURE

CROSS-REFERENCE TO RELATED APPLICATIONS

This application is a national stage application filed under 35 USC 371 of International Patent Application No. PCT/CN2018/112515, filed Sep. 19, 2019, which claims the benefit of Chinese Patent Application No. 201810210745.9, filed Mar. 14, 2018, each of which is incorporated herein, in its entirety, by reference.

TECHNICAL FIELD

The disclosure pertains to a method for preparing a high capacity hydrogen storage material, and particularly pertains to a method for preparing lithium borohydride by means of solid-phase ball milling at room temperature.

BACKGROUND

Energy is the material basis for the progress and development of human production and social activities, and also the basis for human survival. With the rapid development of human society, the demand for energy is continuously increasing. In the past few decades, human beings have recklessly exploited and utilized fossil fuels, which has brought about huge energy crisis and increasingly serious environmental issues, posing a great threat to the sustainable development of mankind's society. Under the dual pressure of energy crisis and environmental pollution, it is urgent to develop new sustainable green energy resources. Hydrogen energy, which may work as a clean, abundant and fluctuating renewable energy carrier, is regarded as one of the most alternatives to fossil fuels in the future. It shows significant advantages with high energy density (142 MJ/kg, as three times as that of gasoline), environmentally benign product of oxidation (water), and renewability, thus the research upon hydrogen energy systems has received much attention. The storage of hydrogen is the most critical part in the development and utilization of hydrogen energy. Compared to cryogenic-liquid hydrogen storage and ultrahigh-pressure hydrogen tanks, solid medium is a favorable substitute with advantages of reversible and safe hydrogen storage, which is considered as the most promising hydrogen storage method.

Lithium borohydride ($LiBH_4$) has attracted extensive attention from hydrogen-storage researchers all over the world, due to its high gravimetric hydrogen capacity (18.5% wt. %) and volumetric hydrogen density (121 kg $H_2/m^3$). In the hydrolytic process, it may supply hydrogen with a capacity of 13.9 wt % (based on the weight of hydrides and the stoichiometric amount of water required), which is higher than 8.9 wt. % for $NH_3BH_3$ hydrolysis and 7.3 wt. % for $NaBH_4$ hydrolysis as well as those of other common hydrolysis systems. If the water produced in the fuel cell is recycled and utilized to react with $LiBH_4$, then the hydrogen capacity can be increased to 37.0 wt. %, enabling it a promising hydrogen source for proton exchange membrane fuel cells (PEMFCs). However, the hydrolysis of lithium borohydride is plagued by the irreversibility, and it's difficult to regenerate lithium borohydride via recycling the spent fuel with low cost. These restrict the wide applications of lithium borohydride in hydrogen production areas.

Commercial $LiBH_4$ is synthesized via the metathesis reaction of $NaBH_4$ and $LiCl$ in isopropylamine solution, the reaction of which is described as following equation:

$$NaBH_4 + LiCl \rightarrow LiBH_4 + NaCl \quad \quad 1\text{-}1$$

After the isopropylamine solvent is removed, diethyl ether is used for the extraction of $LiBH_4$ ($LiBH_4$ is soluble in diethyl ether, while sodium chloride is substantially insoluble). The filter residues are separated to get an extraction solution of $LiBH_4$. Finally, the solution is volatilized under suitable conditions to obtain solid lithium borohydride with a purity of 97%-98%, and the yield is about 75%.

In conclusion, the expensive sodium borohydride is employed to synthesize lithium borohydride on a large scale in industrial production, where the process is complicated and the cost of raw materials is high, thus rendering it impossible to meet the requirements of hydrogen production by hydrolysis.

According to recent research results (Journal of Alloys and Compounds, 2007, 404:427-430; Scripta Materialia, 2009, 60(9): 753-755), $LiBH_4$ can be prepared by the reaction of LiH and B with hydrogen under extreme conditions, the reaction equation (1-2) of which is as shown below:

$$LiH + B + 3/2 H_2 \rightarrow LiBH_4 \quad \quad 1\text{-}2$$

The above gas-solid reactions only occur under high-temperature and high-pressure conditions, where the reaction temperature and the hydrogen pressure is 600° C. and 35 MPa, respectively. The extreme synthetic conditions bring about serious safe issues during the preparation process.

Another feasible preparation technique is high-energy ball-milling method. For example, $LiBH_4$ is successfully synthesized via ball milling a mixture of LiH and crystalline B under $H_2$ atmosphere (0.3 to 1 MPa). However, the yields of $LiBH_4$ are no more than 30% for either thermochemical method or high-energy ball-milling technique. The further results indicate that the chemical inertness of boron, i.e, a strong B—B bond, is the key factor that hinders the formation of $LiBH_4$.

In summary, the current commercial $LiBH_4$ is obtained by the metathesis reaction of sodium borohydride and lithium chloride. However, the synthesis of sodium borohydride requires a large amount of precious metal sodium, incurring serious waste pollution issues. Though this wet chemical method obtains desirable yields, its shortages of high cost, complicated synthetic process and difficulty in recycling spent boron resources have restricted its large-scale application as a hydrogen storage material on onboard hydrogen fields. Moreover, the thermochemical method and the high-energy ball-milling technique developed in recent years are plagued by high energy consumption process and low yield, making it difficult to be applied in industrial production.

SUMMARY

To solve the shortcomings and deficiencies of the existing technologies, the present invention has provided a method for preparing lithium borohydride through solid-phase ball milling at room temperature. In this method, lithium borohydride is directly synthesized in one step via recycling the hydrolysis byproducts of lithium borohydride (hydrous lithium metaborate and dehydrated lithium metaborate) through the solid-phase ball milling process, which possesses the advantages of mild synthetic conditions, facile preparation process, and high economic efficiency.

The purpose of the invention is realized through the following technical scheme.

A method for preparing lithium borohydride by means of solid-phase ball milling at room temperature, comprising the following steps:

Under room temperature and non-oxidizing atmosphere, high-purity lithium borohydride (LiBH$_4$) is obtained after solid-phase ball milling, separation and purification processes with uniformly mixed magnesium-containing reducing agents and lithium metaborate-based materials as reagents.

Preferably, the non-oxidizing atmosphere is an argon atmosphere, a hydrogen atmosphere or a mixed atmosphere of argon and hydrogen.

Preferably, the non-oxidizing atmosphere holds a pressure of 0-3 MPa.

Preferably, the magnesium-containing reducing agents consist of more than one of magnesium, magnesium hydride, aluminum magnesium and calcium magnesium alloys.

Preferably, the lithium metaborate-based materials are composed of over one of hydrous lithium metaborate and anhydrous lithium metaborate, more preferably hydrous lithium metaborate.

Furthermore, a mixture of hydrous lithium metaborate and anhydrous lithium metaborate with different proportions is applied as raw materials instead of pure hydrous lithium metaborate in this method. The raw material can be extended from pure hydrous lithium metaborate to a mixture of hydrous lithium metaborate and anhydrous lithium metaborate, which increases the application scope of the preparation method and wides the sources of raw materials delivering positive significance on the preparation of lithium borohydride.

More preferably, the hydrous lithium metaborate includes LiBO$_2 \cdot$2H$_2$O, LiBO$_2 \cdot$8H$_2$O or LiBO$_2 \cdot$½H$_2$O.

Preferably, the mixing ratio of the magnesium-containing reducing agents and the lithium metaborate-based materials is determined by the following way:

Assuming that the molar weight of magnesium is $n_1$, the molar weight of aluminium is $n_2$, the molar weight of calcium is $n_3$ in the magnesium-containing reducing agents; wherein $n_1 \geq 0$, $n_2 \geq 0$, $n_3 \geq 0$;

Assuming that the mole number of oxygen is x in lithium metaborate-based materials, wherein x=2 or 4;

then:

$$(n_1 + 1.5n_2 + n_3):x(1:1) \sim (2.5:1).$$

Preferably, the ball mill used in the solid-phase ball milling is a high-energy vibrational ball mill.

Preferably, the ratio of ball-to-powder for the solid-phase ball milling process is set from 30 to 70:1.

Preferably, the rotating speed for the solid-phase ball milling process is 1000 to 1200 rpm (revolutions per minute), and the ball milling time is set from 1 to 20 h.

Preferably, the separation and purification include dissolving the ball-milled mixtures in a solvent, filtration for removing insoluble residues, and evaporating the obtained clear filtrate under high vacuum.

More preferably, the solvent is diethyl ether which is distilled over Na. All of the components in the ball-milled mixtures are insoluble in diethyl ether, except for LiBH$_4$.

More preferably, the pressure of the vacuum drying system is below 0.3 mbar, and the volatilized diethyl ether is sublimated at the bottom of a cold trap placed in liquid nitrogen.

Compared with the prior technologies, the present invention has the following advantages and beneficial effects:

(1) In the present invention, lithium borohydride is directly synthesized from the solid-phase reaction of lithium metaborate-based materials and magnesium-containing reducing agents in one step using the mechanical energy of ball milling under room temperature and ambient pressure, avoiding the high temperature and high pressure of the gas-solid reaction (LiH+B+3/2H$_2 \rightarrow$LiBH$_4$), which possesses the advantages of high safety factor, low energy consumption, mild reaction conditions, controllable reaction procedures, and readily availability;

(2) Compared with the wet chemical method in industrial production, the preparation method of the invention has numerous advantages of simple and controllable reaction process, zero emissions, and facile synthesis procedure. Moreover, the hydrolysis byproducts of LiBH$_4$ and cheap magnesium and magnesium alloys are employed as the raw materials, realizing a low-cost regeneration of LiBH$_4$;

(3) The raw materials of magnesium-containing reducing agents including magnesium, magnesium hydride or magnesium aluminum alloys used in the present invention are abundant and the industrial production technology is mature, making it suitable for large-scale production and applications;

(4) The yield of LiBH$_4$ in the present invention is much superior to that of similar methods (high-energy ball milling of the mixture of LiH and B under H$_2$ atmosphere with a yield of 27%), where the optimal yield can reach 76.5%, providing a technical condition for efficient production;

(5) In the present invention, hydrogen carried in the crystal water bound to the hydrolysis byproducts is directly used as total or partial hydrogen sources for LiBH$_4$, reducing the costs of providing additional hydrogen sources. Moreover, the essence of the synthesis process is converting H$^+$ from coordinated water bound to hydrolysis byproducts into H$^-$ stored in the hydrogen storage material, realizing the integration of hydrogen production from LiBH$_4$ and its storage in a closed material cycle.

DESCRIPTION OF THE EMBODIMENTS

The technical proposal of the invention will be described in detail below in combination with specific embodiments and attached figures, and the protection scope and implementation of the invention are not limited thereto.

In specific embodiments, the process of separation and purification is as below:

In a glovebox filled with argon atmosphere, the ball-milled mixtures are dissolved and extracted with the distilled diethyl ether, and then filtered to remove the insoluble residues and a clear filtrate is acquired; the colatuie is evaporated under high vacuum to obtain high-purity lithium borohydride powder; finally the yield of regenerated $LiBH_4$ was quantitatively determined by iodometric analysis.

In specific embodiments, the target products prepared are mainly characterized over Fourier infrared spectrometer (FT-IR) or X-ray diffractometer (XRD).

Embodiment 1

Figure 2:
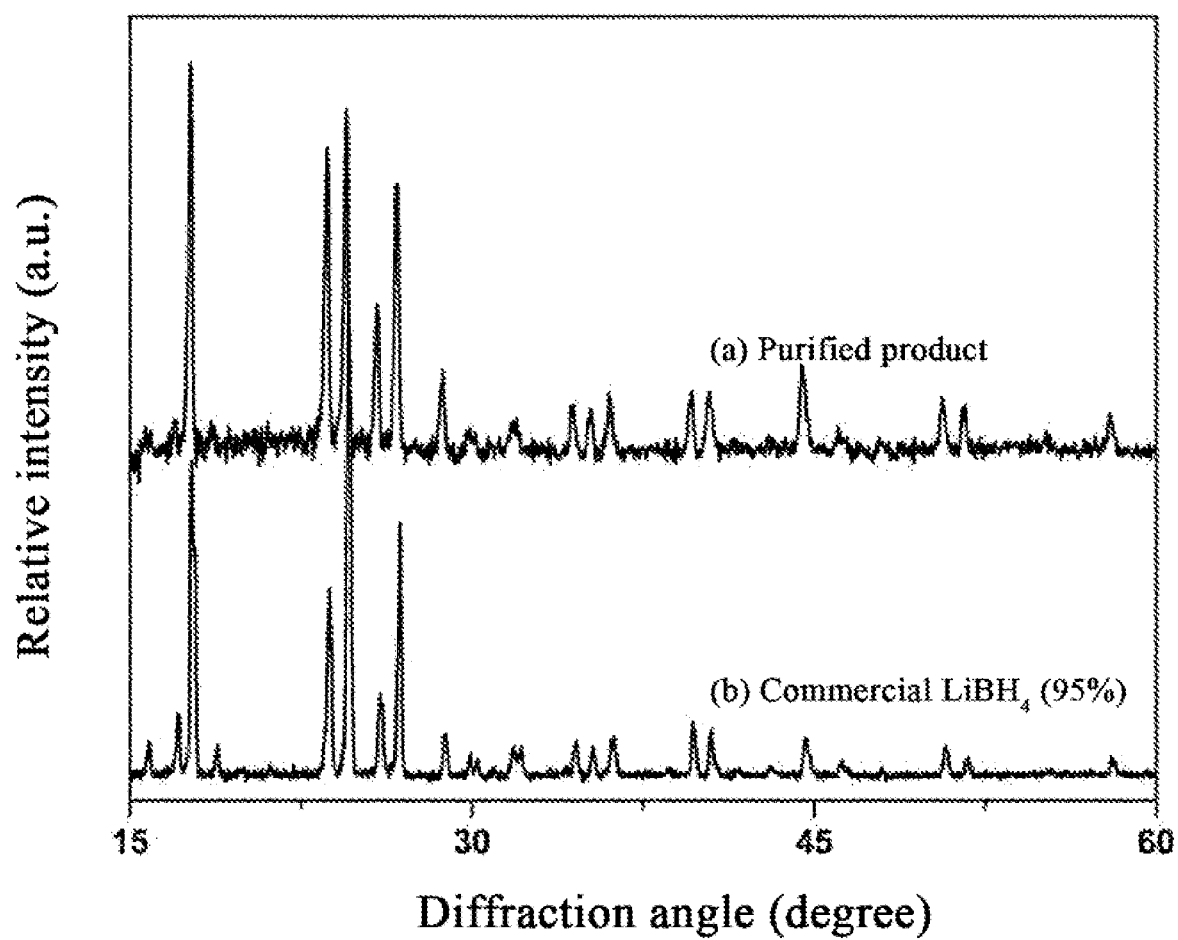
FIG. 2 shows X-ray diffraction (XRD) patterns of lithium borohydride prepared in Embodiment 1 and the commercial lithium borohydride.
Figure 3:
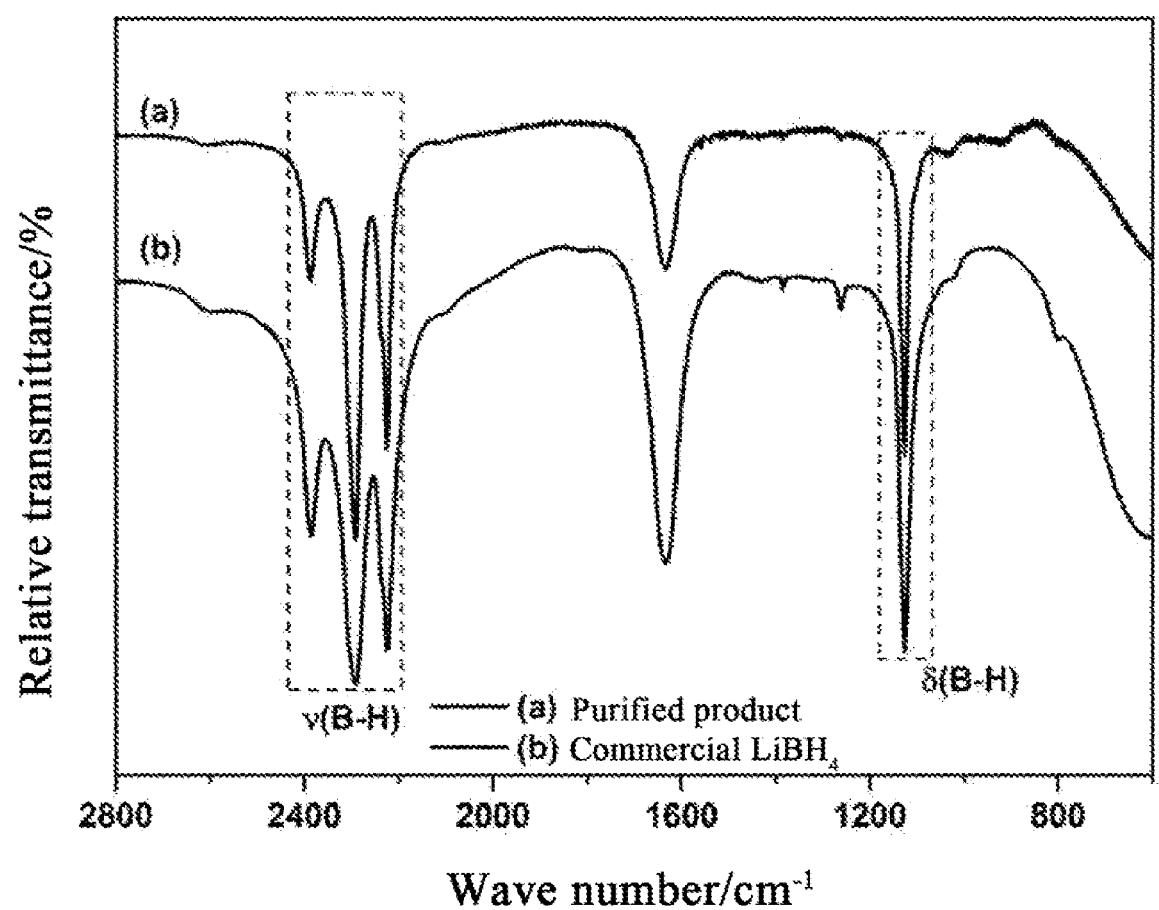
FIG. 3 shows FTIR spectra of lithium borohydride purified in Embodiment 1.

Preparation of lithium borohydride through solid-phase ball milling at room temperature, the procedures of which are given below:

At room temperature, in a glovebox filled with argon atmosphere of 0.1 MPa, Mg and $LiBO_2 \cdot 2H_2O$ (at a molar ratio of 5:1) are mixed, loaded into a ball milling jar which can be well sealed. The ball milling process is then conducted on a high energy vibrational ball mill (QM-3C) under argon atmosphere, where the ratio of ball-to-powder is 50:1, the rotating speed is 1200 rpm, and the ball milling time is 20 h. The milling process is carried out by alternating 30 min of milling and 30 min of rest;

The ball-milled mixtures after ball milling process are dissolved and extracted with the distilled diethyl ether, and then filtered to remove the insoluble residues and a clear filtrate is acquired; the colatuie is evaporated under high vacuum to obtain a white powder; The XRD patterns of the obtained white powder and the commercial $LiBH_4$ (95%) are shown in FIG. 2. It can be seen that the white powder is lithium borohydride with high purity, the yield of which is quantitatively determined to be 38.0% by iodometric analysis.

The price of raw material Mg is about 2.2/kg (based on the market price of magnesium at about ¥14500/ton), thus the cost of raw materials for the production of 1 ton of lithium borohydride is about $33576; whereas the price of raw material lithium chloride is about $9.95/kg, and the price of sodium borohydride is about $20/kg in industrial application, the cost of raw materials for the production of 1 ton of lithium borohydride would be about $72138; The preparation cost in this embodiment is significantly decreased in terms of the price of raw materials.

Embodiment 2

Preparation of lithium borohydride through solid-phase ball milling at room temperature, the procedures of which are given below:

At room temperature, in a glovebox filled with argon atmosphere of 0.1 MPa, Mg and $LiBO_2 \cdot 2H_2O$ (at a molar ratio of 4.5:1) are mixed, loaded into a ball milling jar which can be well sealed. The ball milling process is then conducted on a high energy vibrational ball mill (QM-3C), for which the ratio of ball-to-powder is 50:1, the rotating speed is 1200 rpm, and the time is 5 h. The milling process is carried out by alternating 30 min of milling and 30 min of rest.

Figure 4:
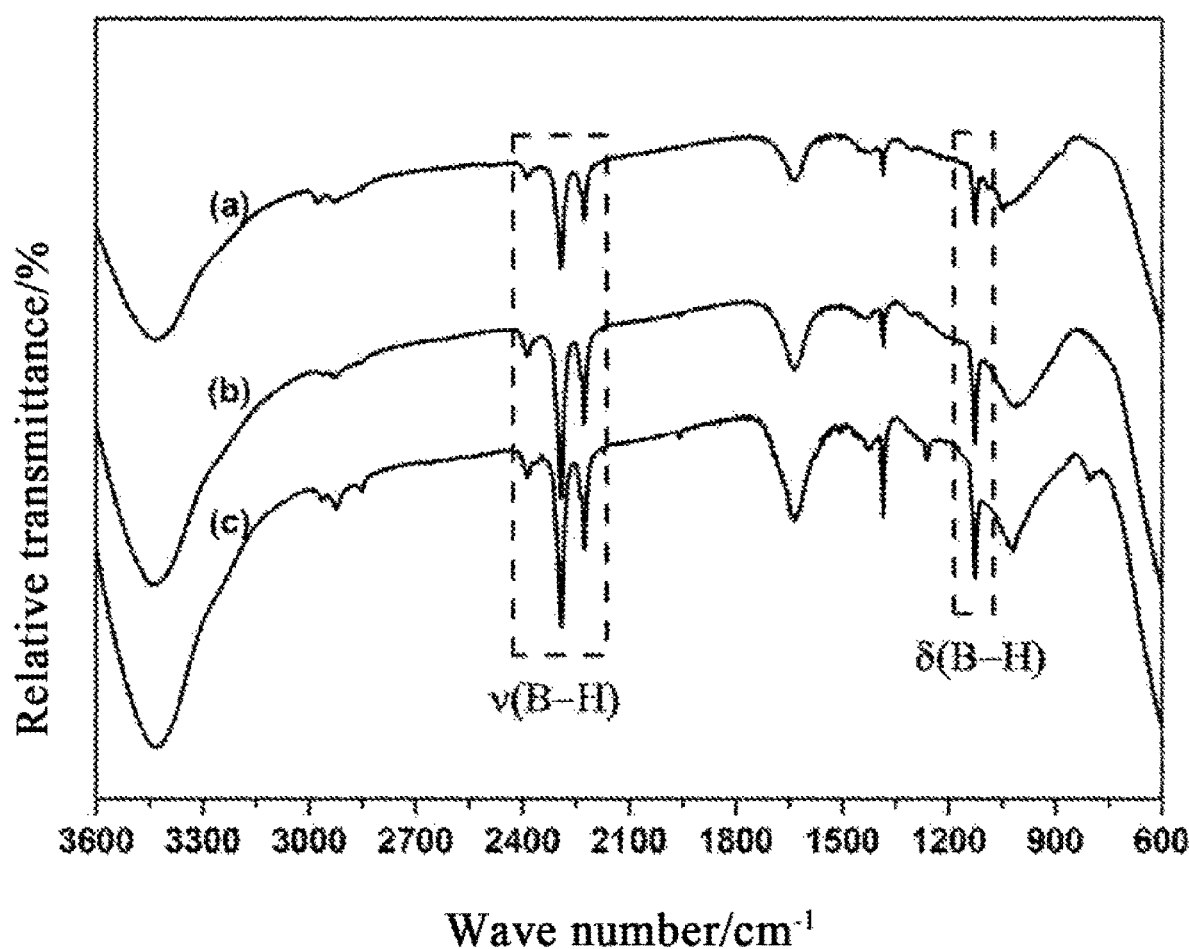
FIG. 4 shows FTIR spectra of the ball-milled mixtures of magnesium and lithium metaborate dihydrate in Embodiments 2 to 4, wherein, each curve refers to a corresponding embodiment, respectively: a—Embodiment 2, b—Embodiment 3, c—Embodiment 4.

FTIR spectrum of the ball-milled mixtures is as shown in curve a of FIG. 4, from which it can be seen that, the peaks appeared at 2200 to 2400 $cm^{-1}$ and 1125 $cm^{-1}$ in FTIR correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively determined to be 7.1% by iodometric analysis.

Embodiment 3

Preparation of lithium borohydride through solid-phase ball milling at room temperature, the procedures of which are given below:

At room temperature, in a glovebox filled with argon atmosphere of 0.1 MPa, Mg and $LiBO_2 \cdot 2H_2O$ (at a molar ratio of 4.5:1) are mixed, loaded into a ball milling jar which can be well sealed. The ball milling process is then conducted on a high energy vibrational ball mill (QM-3C), for which the ratio of ball-to-powder is 50:1, the rotating speed is 1200 rpm, and the time is 10 h. The milling process is carried out by alternating 30 min of milling and 30 min of rest.

Figure 7:
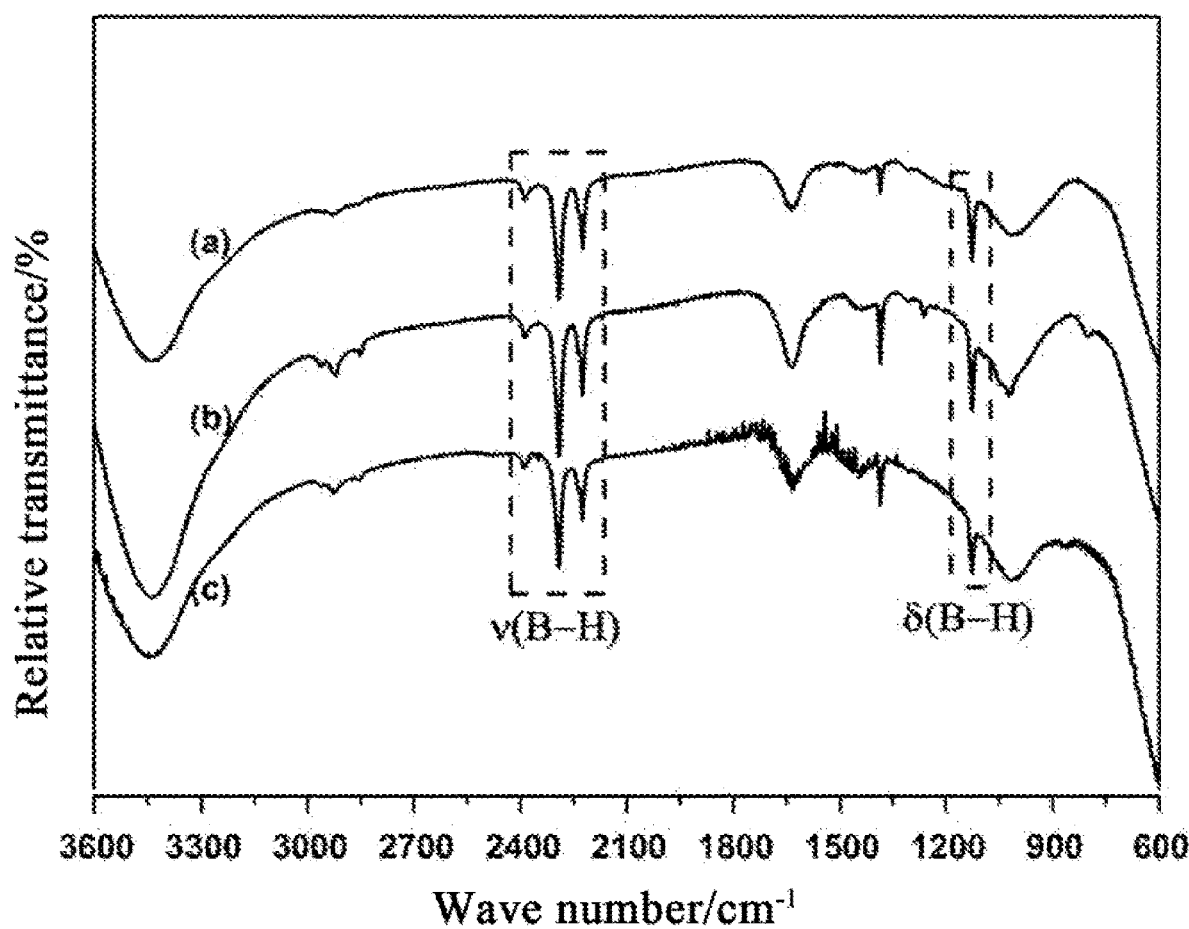
FIG. 7 shows FTIR spectra of the ball-milled mixtures of magnesium and lithium metaborate dihydrate in Embodiment 3 and Embodiments 16 to 17, wherein, each curve corresponds to a corresponding embodiment, respectively: a—Embodiment 3, b—Embodiment 16, c—Embodiment 17.

FTIR spectra of the ball-milled mixtures is as shown in curve b of FIG. 4, consistent with curve a of FIG. 7. It can be seen from FIG. 4, the peaks appeared at 2200 to 2400 cm$^{-1}$ and 1125 cm$^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure LiBH$_4$ over XRD analysis, and the yield is quantitatively determined to be 18.1% by iodometric analysis.

Embodiment 4

Preparation of lithium borohydride through solid-phase ball milling at room temperature, the procedures of which are given below:

At room temperature, in a glovebox filled with argon atmosphere of 0.1 MPa, Mg and LiBO$_2$·2H$_2$O (at a molar ratio of 4.5:1) are mixed, loaded into a ball milling jar which can be well sealed. The ball milling process is then conducted on a high energy vibrational ball mill (QM-3C), for which the ratio of ball-to-powder is 50:1, the rotating speed is 1100 rpm, and the time is 15 h. The milling process is carried out by alternating 30 min of milling and 30 min of rest.

FTIR spectra of the ball-milled mixtures is as shown in curve c of FIG. 4, from which it can be seen that, the peaks appeared at 2200 to 2400 cm$^{-1}$ and 1125 cm$^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure LiBH$_4$ over XRD analysis, and the yield is quantitatively calculated to be 27.7% by iodometric analysis.

Embodiment 5

Preparation of lithium borohydride through solid-phase ball milling at room temperature, the procedures of which are given below:

At room temperature, in a glovebox filled with argon atmosphere of 0.1 MPa, Mg and LiBO$_2$·2H$_2$O (at a molar ratio of 5:1) are mixed, loaded into a ball milling jar which can be well sealed. The ball milling process is then conducted on a high energy vibrational ball mill (QM-3C), for which the ratio of ball-to-powder is 30:1, the rotating speed is 1200 rpm, and the time is 1 h. The milling process is carried out by alternating 30 min of milling and 30 min of rest.

Figure 1:
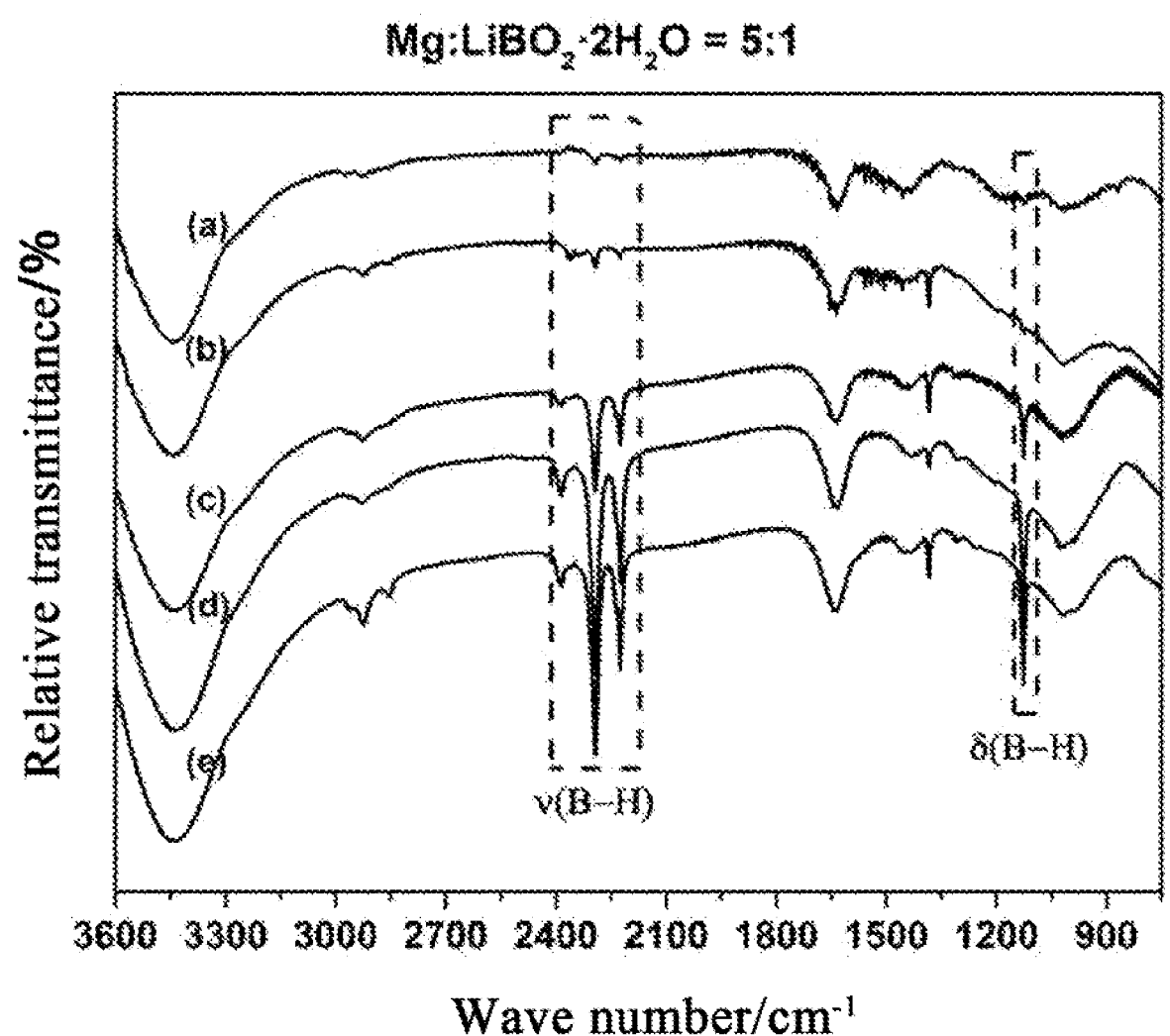
FIG. 1 shows FTIR spectra of the ball-milled mixtures of magnesium and lithium metaborate dihydrate in Embodiments 5 to 8 and Embodiment 10, wherein, each curve refers to a corresponding embodiment, respectively: a—Embodiment 5, b—Embodiment 6, c—Embodiment 7, d—Embodiment 8, e—Embodiment 10.

FTIR spectra of the ball-milled mixtures is as shown in curve a of FIG. 1, from which it can be seen that, the peaks appeared at 2200 to 2400 cm$^{-1}$ and 1125 cm$^{-1}$ correspond to the vibration absorption peaks of B—H bond, demonstrating the generation of lithium borohydride; and these peaks are relatively weak, demonstrating that the reaction for the generation of lithium borohydride is going on.

Embodiment 6

Preparation of lithium borohydride through solid-phase ball milling at room temperature, the procedures of which are given below:

At room temperature, in a glovebox filled with argon atmosphere of 0.1 MPa, Mg and LiBO$_2$·2H$_2$O (at a molar ratio of 5:1) are mixed, loaded into a ball milling jar which can be well sealed. The ball milling process is then conducted on a high energy vibrational ball mill (QM-3C), for which the ratio of ball-to-powder is 30:1, the rotating speed is 1200 rpm, and the time is 2.5 h. The milling process is carried out by alternating 30 min of milling and 30 min of rest.

FTIR spectra of the ball-milled mixtures is as shown in curve b of FIG. 1, from which it can be seen that, the peaks appeared at 2200 to 2400 cm$^{-1}$ and 1125 cm$^{-1}$ correspond to the vibration absorption peaks of B—H bond, demonstrating the generation of lithium borohydride; and these vibration peaks have been strengthened compared to that in Embodiment 5, indicating that the yield of lithium borohydride increases with the further prolonged ball milling time.

Embodiment 7

Preparation of lithium borohydride through solid-phase ball milling at room temperature, the procedures of which are given below:

At room temperature, in a glovebox filled with argon atmosphere of 0.1 MPa, Mg and LiBO$_2$·2H$_2$O (at a molar ratio of 5:1) are mixed, loaded into a ball milling jar which can be well sealed. The ball milling process is then conducted on a high energy vibrational ball mill (QM-3C), for which the ratio of ball-to-powder is 50:1, the rotating speed is 1200 rpm, and the time is 5 h. The milling process is carried out by alternating 30 min of milling and 30 min of rest. FTIR spectra of the ball-milled mixtures is as shown in curve c of FIG. 1, consistent with curve b of FIG. 6. It can be seen from curve c in FIG. 1 that, the peaks appeared at 2200 to 2400 cm$^{-1}$ and 1125 cm$^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure LiBH$_4$ over XRD analysis, and the yield is quantitatively calculated to be 9.8% by iodometric analysis.

Embodiment 8

Preparation of lithium borohydride through solid-phase ball milling at room temperature, the procedures of which are given below:

At room temperature, in a glovebox filled with argon atmosphere of 0.1 MPa, Mg and LiBO$_2$·2H$_2$O (at a molar ratio of 5:1) are mixed, loaded into a ball milling jar which can be well sealed. The ball milling process is then conducted on a high energy vibrational ball mill (QM-3C), for which the ratio of ball-to-powder is 50:1, the rotating speed is 1000 rpm, and the time is 10 h. The milling process is carried out by alternating 30 min of milling and 30 min of rest.

FTIR spectra of the ball-milled mixtures is as shown in curve d of FIG. 1, from which it can be seen that, the peaks appeared at 2200 to 2400 cm$^{-1}$ and 1125 cm$^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure LiBH$_4$ over XRD analysis, and the yield is quantitatively calculated to be 25.7% by iodometric analysis.

Embodiment 9

Preparation of lithium borohydride through solid-phase ball milling at room temperature, the procedures of which are given below:

At room temperature, in a glovebox filled with argon atmosphere of 0.1 MPa, Mg and $LiBO_2 \cdot 2H_2O$ (at a molar ratio of 5:1) are mixed, loaded into a ball milling jar which can be well sealed. The ball milling process is then conducted on a high energy vibrational ball mill (QM-3C), for which the ratio of ball-to-powder is 30:1, the rotating speed is 1200 rpm, and the time is 15 h. The milling process is carried out by alternating 30 min of milling and 30 min of rest.

Figure 8:
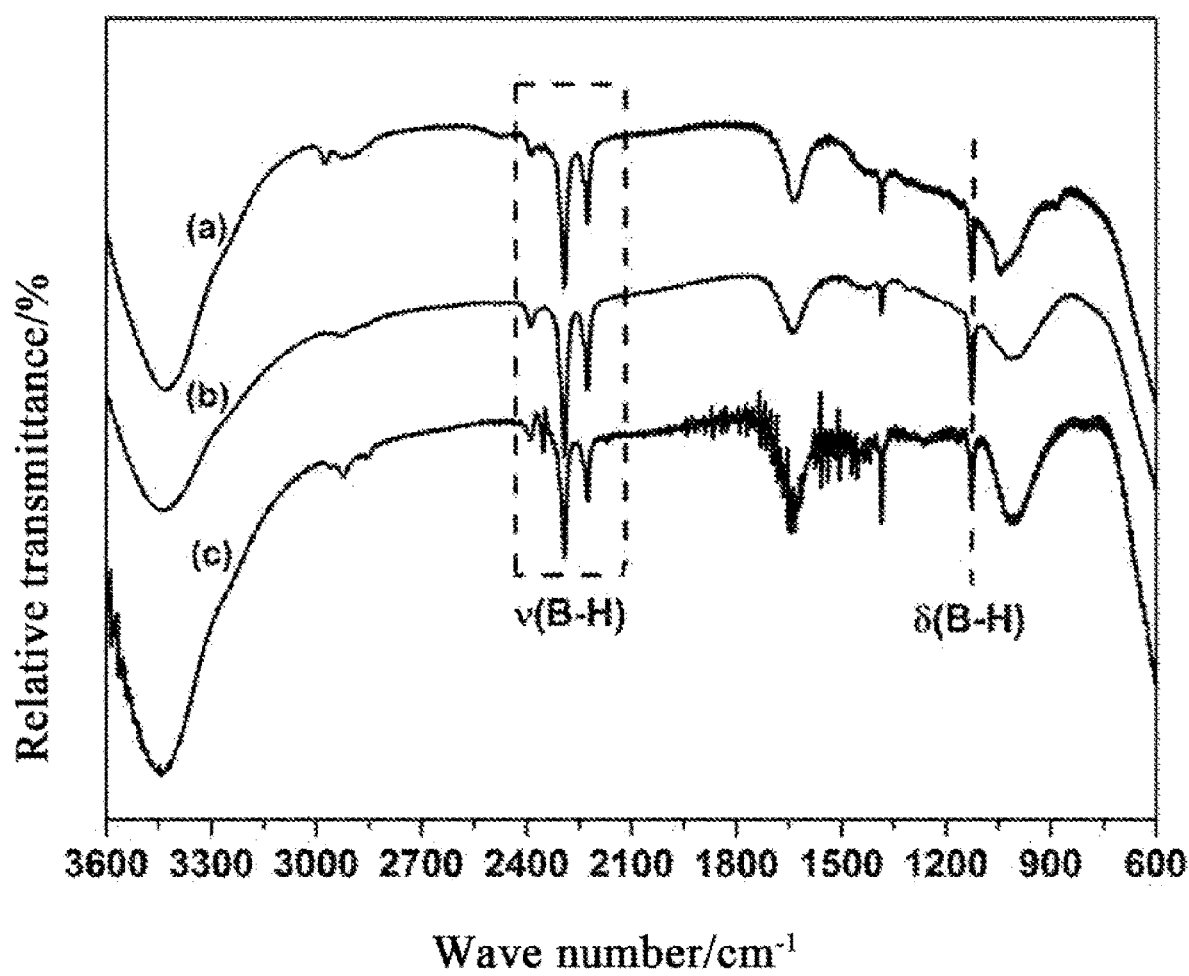
FIG. 8 shows FTIR spectra of the ball-milled mixtures of magnesium and lithium metaborate dihydrate in Embodiment 9, Embodiment 13 and Embodiment 18, wherein, each curve refers to a corresponding embodiment, respectively: a—Embodiment 18, b—Embodiment 9, c—Embodiment 13.

FTIR spectra of the ball-milled mixtures is as shown in curve b of FIG. 8, from which it can be seen that, the peaks appeared at 2200 to 2400 $cm^{-1}$ and 1125 $cm^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 30.0% by iodometric analysis.

Embodiment 10

Preparation of lithium borohydride through solid-phase ball milling at room temperature, the procedures of which are given below:

At room temperature, in a glovebox filled with argon atmosphere of 0.1 MPa, Mg and $LiBO_2 \cdot 2H_2O$ (at a molar ratio of 5:1) are mixed, loaded into a ball milling jar which can be well sealed. The ball milling process is then conducted on a high energy vibrational ball mill (QM-3C), for which the ratio of ball-to-powder is 50:1, the rotating speed is 1200 rpm, and the time is 15 h. The milling process is carried out by alternating 30 min of milling and 30 min of rest.

FTIR spectra of the ball-milled mixtures is as shown in curve e of FIG. 1, from which it can be seen that, the peaks appeared at 2200 to 2400 $cm^{-1}$ and 1125 $cm^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 37.9% by iodometric analysis.

Embodiment 11

Preparation of lithium borohydride through solid-phase ball milling at room temperature, the procedures of which are given below:

At room temperature, in a glovebox filled with argon atmosphere of 0.1 MPa, Mg and $LiBO_2 \cdot 2H_2O$ (at a molar ratio of 5.5:1) are mixed, loaded into a ball milling jar which can be well sealed. The ball milling process is then conducted on a high energy vibrational ball mill (QM-3C), for which the ratio of ball-to-powder is 50:1, the rotating speed is 1200 rpm, and the time is 5 h. The milling process is carried out by alternating 30 min of milling and 30 min of rest.

Figure 5:
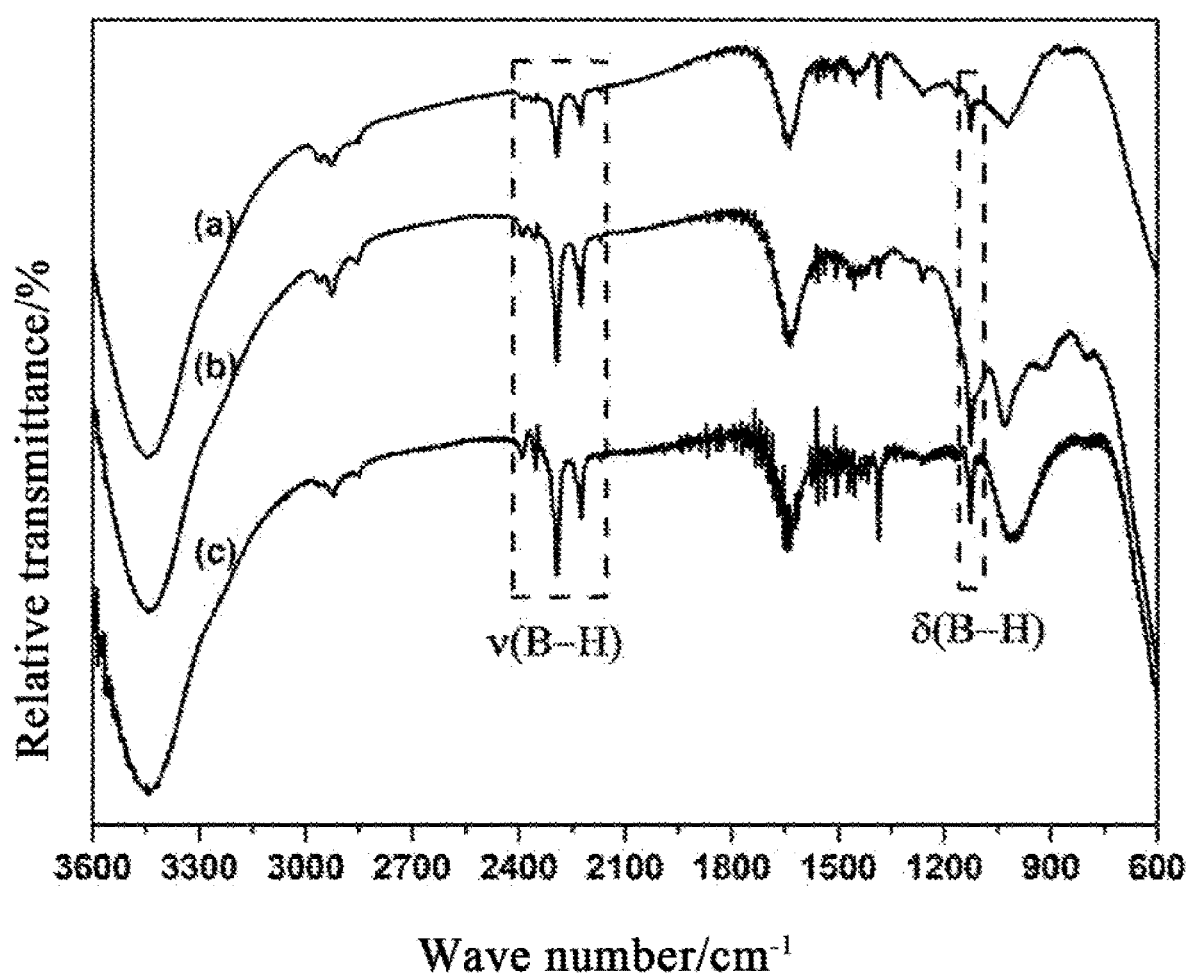
FIG. 5 shows FTIR spectra of the ball-milled mixtures of magnesium and lithium metaborate dihydrate in Embodiments 11 to 13, wherein, each curve refers to a corresponding embodiment, respectively: a—Embodiment 11, b—Embodiment 12, c—Embodiment 13.

FTIR spectra of the ball-milled mixtures is as shown in curve a of FIG. 5, from which it can be seen that, the peaks appeared at 2200 to 2400 $cm^{-1}$ and 1125 $cm^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 5.8% by iodometric analysis.

Embodiment 12

Preparation of lithium borohydride through solid-phase ball milling at room temperature, the procedures of which are given below:

At room temperature, in a glovebox filled with argon atmosphere of 0.1 MPa, Mg and $LiBO_2 \cdot 2H_2O$ (at a molar ratio of 5.5:1) are mixed, loaded into a ball milling jar which can be well sealed. The ball milling process is then conducted on a high energy vibrational ball mill (QM-3C), for which the ratio of ball-to-powder is 50:1, the rotating speed is 1200 rpm, and the time is 10 h. The milling process is carried out by alternating 30 min of milling and 30 min of rest.

FTIR spectra of the ball-milled mixtures is as shown in curve b of FIG. 5, from which it can be seen that, the peaks appeared at 2200 to 2400 $cm^{-1}$ and 1125 $cm^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 13.8% by iodometric analysis.

Embodiment 13

Preparation of lithium borohydride through solid-phase ball milling at room temperature, the procedures of which are given below:

At room temperature, in a glovebox filled with argon atmosphere of 0.1 MPa, Mg and $LiBO_2 \cdot 2H_2O$ (at a molar ratio of 5.5:1) are mixed, loaded into a ball milling jar which can be well sealed. The ball milling process is then conducted on a high energy vibrational ball mill (QM-3C), for which the ratio of ball-to-powder is 50:1, the rotating speed is 1200 rpm, and the time is 15 h. The milling process is carried out by alternating 30 min of milling and 30 min of rest.

FTIR spectra of the ball-milled mixtures is as shown in curve c of FIG. 5, consistent with curve c of FIG. 8. It can be seen from curve c of FIG. 5, the peaks appeared at 2200 to 2400 $cm^{-1}$ and 1125 $cm^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 12.7% by iodometric analysis.

Embodiment 14

Preparation of lithium borohydride through solid-phase ball milling at room temperature, the procedures of which are given below:

At room temperature, in a glovebox filled with argon atmosphere of 0.1 MPa, Mg and $LiBO_2 \cdot 2H_2O$ (at a molar ratio of 4.5:1) are mixed, loaded into a ball milling jar which can be well sealed. The ball milling process is then conducted on a high energy vibrational ball mill (QM-3C), for which the ratio of ball-to-powder is 30:1, the rotating speed is 1200 rpm, and the time is 5 h. The milling process is carried out by alternating 30 min of milling and 30 min of rest.

Figure 6:
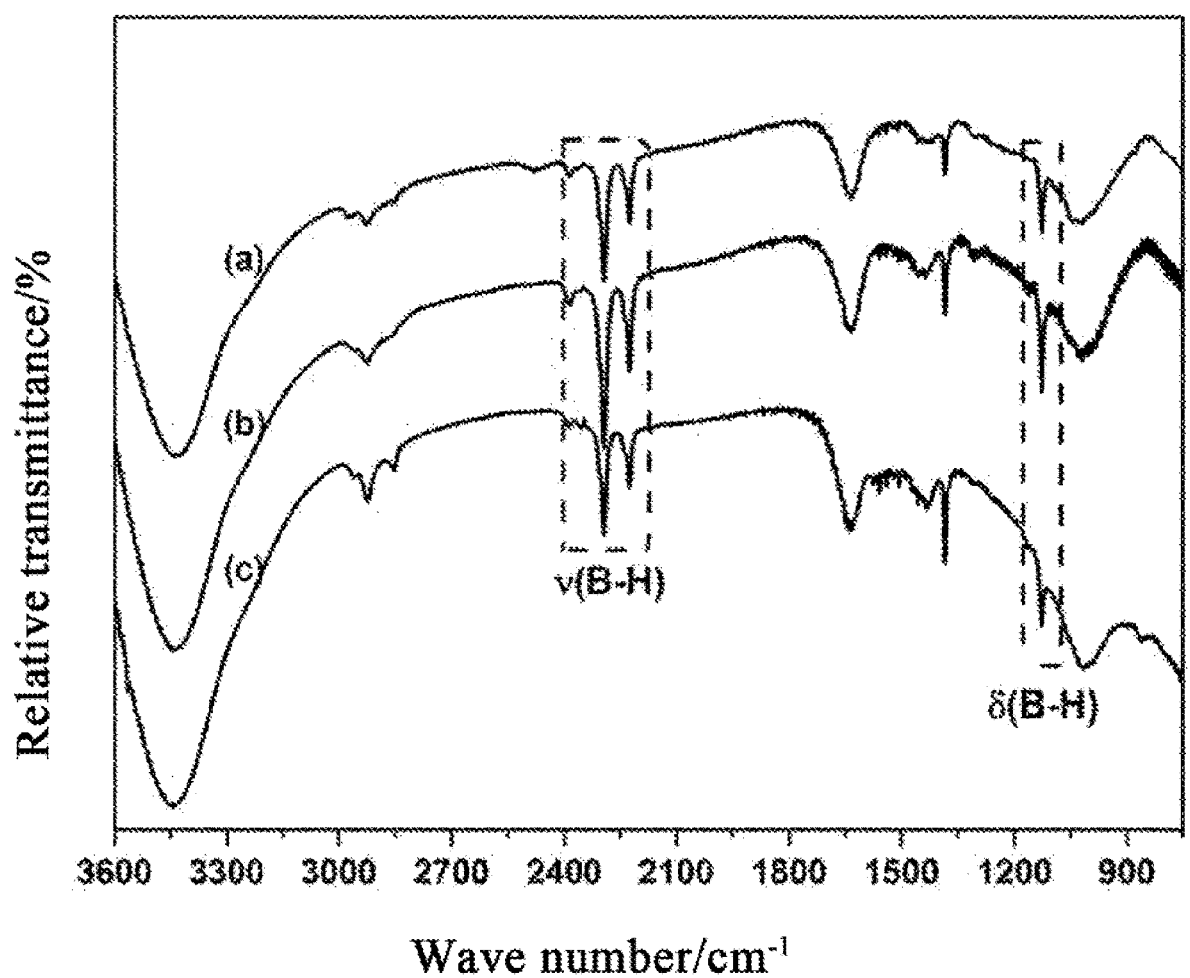
FIG. 6 shows FTIR spectra of the ball-milled mixtures of magnesium and lithium metaborate dihydrate in Embodiment 7 and Embodiments 14 to 15, wherein, each curve refers to a corresponding embodiment, respectively: a—Embodiment 14, b—Embodiment 7, c—Embodiment 15.

FTIR spectra of the ball-milled mixture is as shown in curve a of FIG. 6, from which it can be seen that the peaks appeared at 2200 to 2400 $cm^{-1}$ and 1125 $cm^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 3.8% by iodometric analysis.

Embodiment 15

Preparation of lithium borohydride through solid-phase ball milling at room temperature, the procedures of which are given below:

At room temperature, in a glovebox filled with argon atmosphere of 0.1 MPa, Mg and $LiBO_2 \cdot 2H_2O$ (at a molar ratio of 5.5:1) are mixed, loaded into a ball milling jar which can be well sealed. The ball milling process is then conducted on a high energy vibrational ball mill (QM-3C), for which the ratio of ball-to-powder is 70:1, the rotating speed is 1200 rpm, and the time is 5 h. The milling process is carried out by alternating 30 min of milling and 30 min of rest.

FTIR spectra of the ball-milled mixtures is as shown in curve c of FIG. 6, from which it can be seen that the peaks appeared at 2200 to 2400 $cm^{-1}$ and 1125 $cm^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 9.4% by iodometric analysis.

Embodiment 16

Preparation of lithium borohydride through solid-phase ball milling at room temperature, the procedures of which are given below:

At room temperature, in a glovebox filled with argon atmosphere of 0.1 MPa, Mg and $LiBO_2 \cdot 2H_2O$ (at a molar ratio of 5:1) are mixed, loaded into a ball milling jar which can be well sealed. The ball milling process is then conducted on a high energy vibrational ball mill (QM-3C), for which the ratio of ball-to-powder is 70:1, the rotating speed is 1200 rpm, and the time is 10 h. The milling process is carried out by alternating 30 min of milling and 30 min of rest.

FTIR spectra of the ball-milled mixtures is as shown in curve b of FIG. 7, from which it can be seen that, the peaks appeared at 2200 to 2400 $cm^{-1}$ and 1125 $cm^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 25.6% by iodometric analysis.

Embodiment 17

Preparation of lithium borohydride through solid-phase ball milling at room temperature, the procedures of which are given below:

At room temperature, in a glovebox filled with argon atmosphere of 0.1 MPa, Mg and $LiBO_2 \cdot 2H_2O$ (at a molar ratio of 5.5:1) are mixed, loaded into a ball milling jar which can be well sealed. The ball milling process is then conducted on a high energy vibrational ball mill (QM-3C), for which the ratio of ball-to-powder is 30:1, the rotating speed is 1000 rpm, and the time is 10 h. The milling process is carried out by alternating 30 min of milling and 30 min of rest.

FTIR spectra of the ball-milled mixtures is as shown in curve c of FIG. 7, from which it can be seen that, the peaks appeared at 2200 to 2400 $cm^{-1}$ and 1125 $cm^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 11.4% by iodometric analysis.

Embodiment 18

Preparation of lithium borohydride through solid-phase ball milling at room temperature, the procedures of which are given below:

At room temperature, in a glovebox filled with argon atmosphere of 0.1 MPa, Mg and $LiBO_2 \cdot 2H_2O$ (at a molar ratio of 4.5:1) are mixed, loaded into a ball milling jar which can be well sealed. The ball milling process is then conducted on a high energy vibrational ball mill (QM-3C), for which the ratio of ball-to-powder is 70:1, the rotating speed is 1200 rpm, and the time is 15 h. The milling process is carried out by alternating 30 min of milling and 30 min of rest.

FTIR spectra of the ball-milled mixtures is as shown in curve a of FIG. 8, from which it can be seen that, the peaks appeared at 2200 to 2400 $cm^{-1}$ and 1125 $cm^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 10.2% by iodometric analysis.

Embodiment 19

Preparation of lithium borohydride through solid-phase ball milling at room temperature, the procedures of which are given below:

At room temperature, in a glovebox filled with argon atmosphere of 0.1 MPa, $MgH_2$ and $LiBO_2 \cdot 2H_2O$ (at a molar ratio of 4:1) are mixed, loaded into a ball milling jar which can be well sealed. The ball milling process is then conducted on a high energy vibrational ball mill (QM-3C), for which the ratio of ball-to-powder is 50:1, the rotating speed is 1200 rpm, and the time is 5 h. The milling process is carried out by alternating 30 min of milling and 30 min of rest.

Figure 9:
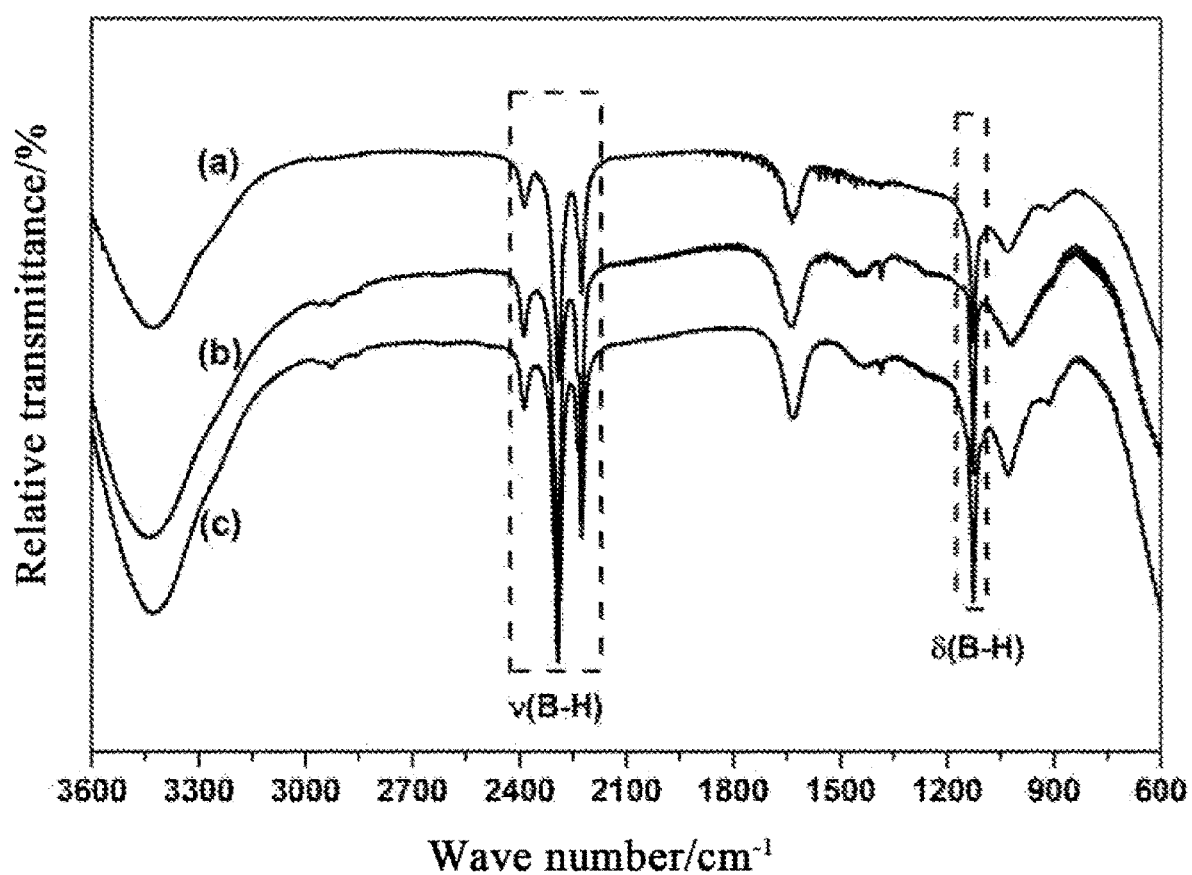
FIG. 9 shows FTIR spectra of the ball-milled mixtures of magnesium and lithium metaborate dihydrate in Embodiments 19 to 21, wherein, each curve refers to a corresponding embodiment, respectively: a—Embodiment 19, b—Embodiment 20, c—Embodiment 21.

FTIR spectra of the ball-milled mixtures is as shown in curve a of FIG. 9, from which it can be seen that the peaks appeared at 2200 to 2400 $cm^{-1}$ and 1125 $cm^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 66.1% by iodometric analysis.

Embodiment 20

Preparation of lithium borohydride through solid-phase ball milling at room temperature, the procedures of which are given below:

At room temperature, in a glovebox filled with argon atmosphere of 0.1 MPa, $MgH_2$ and $LiBO_2 \cdot 2H_2O$ (at a molar ratio of 4:1) are mixed, loaded into a ball milling jar which can be well sealed. The ball milling process is then conducted on a high energy vibrational ball mill (QM-3C), for which the ratio of ball-to-powder is 50:1, the rotating speed is 1100 rpm, and the time is 10 h. The milling process is carried out by alternating 30 min of milling and 30 min of rest.

FTIR spectra of the ball-milled mixtures is as shown in curve b of FIG. 9, from which it can be seen that the peaks appeared at 2200 to 2400 $cm^{-1}$ and 1125 $cm^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 56.5% by iodometric analysis.

Embodiment 21

Preparation of lithium borohydride through solid-phase ball milling at room temperature, the procedures of which are given below:

At room temperature, in a glovebox filled with argon atmosphere of 0.1 MPa, $MgH_2$ and $LiBO_2 \cdot 2H_2O$ (at a molar ratio of 4:1) are mixed, loaded into a ball milling jar which can be well sealed. The ball milling process is then conducted on a high energy vibrational ball mill (QM-3C), for which the ratio of ball-to-powder is 50:1, the rotating speed is 1200 rpm, and the time is 15 h. The milling process is carried out by alternating 30 min of milling and 30 min of rest.

FTIR spectra of the ball-milled mixtures is as shown in curve c of FIG. 9, from which it can be seen that the peaks appeared at 2200 to 2400 $cm^{-1}$ and 1125 $cm^{-1}$ to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 51.6% by iodometric analysis.

Embodiment 22

Preparation of lithium borohydride through solid-phase ball milling at room temperature, the procedures of which are given below:

At room temperature, in a glovebox filled with argon atmosphere of 0.1 MPa, $MgH_2$ and $LiBO_2 \cdot 2H_2O$ (at a molar ratio of 4.5:1) are mixed, loaded into a ball milling jar which can be well sealed. The ball milling process is then conducted on a high energy vibrational ball mill (QM-3C), for which the ratio of ball-to-powder is 50:1, the rotating speed is 1200 rpm, and the time is 5 h. The milling process is carried out by alternating 30 min of milling and 30 min of rest.

Figure 10:
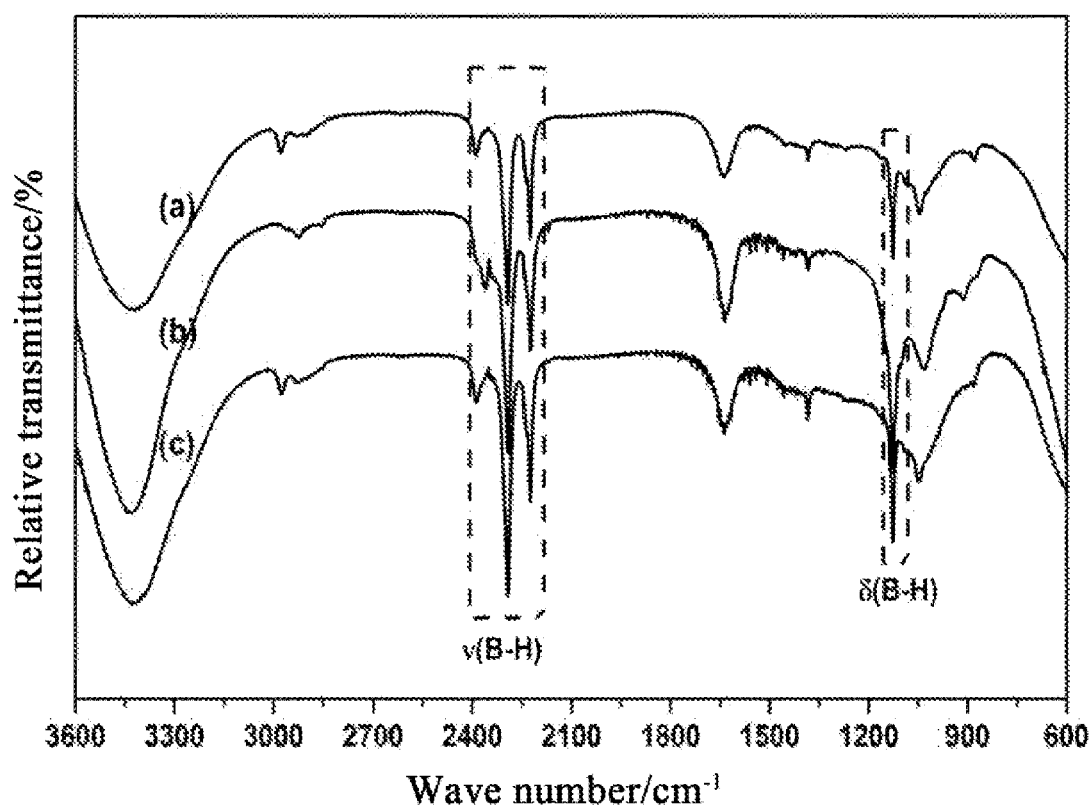
FIG. 10 shows FTIR spectra of the ball-milled mixtures of magnesium and lithium metaborate dihydrate in Embodiments 22 to 24, wherein, each curve refers to a corresponding embodiment, respectively: a—Embodiment 22, b—Embodiment 23, c—Embodiment 24.

FTIR spectra of the ball-milled mixtures is as shown in curve a of FIG. 10, from which it can be seen that, the peaks appeared at 2200 to 2400 $cm^{-1}$ and 1125 $cm^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 56.7% by iodometric analysis.

Embodiment 23

Preparation of lithium borohydride through solid-phase ball milling at room temperature, the procedures of which are given below:

At room temperature, in a glovebox filled with argon atmosphere of 0.1 MPa, $MgH_2$ and $LiBO_2 \cdot 2H_2O$ (at a molar ratio of 4.5:1) are mixed, loaded into a ball milling jar which can be well sealed. The ball milling process is then conducted on a high energy vibrational ball mill (QM-3C), for which the ratio of ball-to-powder is 50:1, the rotating speed is 1200 rpm, and the time is 10 h. The milling process is carried out by alternating 30 min of milling and 30 min of rest.

FTIR spectra of the ball-milled mixtures is as shown in curve b of FIG. 10, from which it can be seen that, the peaks appeared at 2200 to 2400 $cm^{-1}$ and 1125 $cm^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 70.3% by iodometric analysis.

Embodiment 24

Preparation of lithium borohydride through solid-phase ball milling at room temperature, the procedures of which are given below:

At room temperature, in a glovebox filled with argon atmosphere of 0.1 MPa, $MgH_2$ and $LiBO_2 \cdot 2H_2O$ (at a molar ratio of 4.5:1) are mixed, loaded into a ball milling jar which can be well sealed. The ball milling process is then conducted on a high energy vibrational ball mill (QM-3C), for which the ratio of ball-to-powder is 50:1, the rotating speed is 1200 rpm, and the time is 15 h. The milling process is carried out by alternating 30 min of milling and 30 min of rest.

FTIR spectra of the ball-milled mixtures is as shown in curve c of FIG. 10, from which it can be seen that, the peaks appeared at 2200 to 2400 $cm^{-1}$ and 1125 $cm^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 62.4% by iodometric analysis.

Embodiment 25

Preparation of lithium borohydride through solid-phase ball milling at room temperature, the procedures of which are given below:

At room temperature, in a glovebox filled with argon atmosphere of 0.1 MPa, $MgH_2$ and $LiBO_2 \cdot 2H_2O$ (at a molar ratio of 5:1) are mixed, loaded into a ball milling jar which can be well sealed. The ball milling process is then conducted on a high energy vibrational ball mill (QM-3C), for which the ratio of ball-to-powder is 50:1, the rotating speed is 1200 rpm, and the time is 5 h. The milling process is carried out by alternating 30 min of milling and 30 min of rest.

Figure 11:
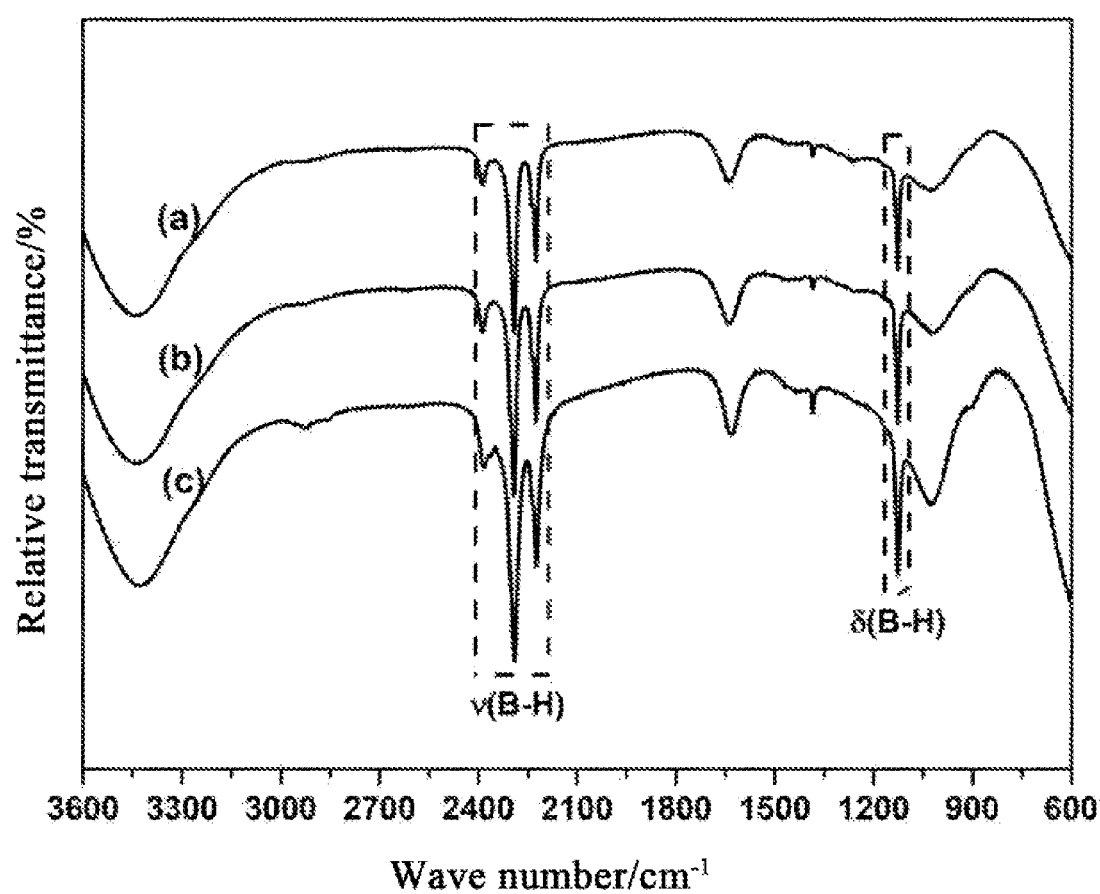
FIG. 11 shows FTIR spectra of the ball-milled mixtures of magnesium and lithium metaborate dihydrate in Embodiments 25 to 27, wherein, each curve refers to a corresponding embodiment, respectively: a—Embodiment 25, b—Embodiment 26, c—Embodiment 27.

FTIR spectra of the ball-milled mixtures is as shown in curve a of FIG. 11, from which it can be seen that the peaks appeared at 2200 to 2400 $cm^{-1}$ and 1125 $cm^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 71.0% by iodometric analysis.

Embodiment 26

Preparation of lithium borohydride through solid-phase ball milling at room temperature, the procedures of which are given below:

At room temperature, in a glovebox filled with argon atmosphere of 0.1 MPa, $MgH_2$ and $LiBO_2 \cdot 2H_2O$ (at a molar ratio of 5:1) are mixed, loaded into a ball milling jar which can be well sealed. The ball milling process is then conducted on a high energy vibrational ball mill (QM-3C), for which the ratio of ball-to-powder is 50:1, the rotating speed is 1200 rpm, and the time is 10 h. The milling process is carried out by alternating 30 min of milling and 30 min of rest.

FTIR spectra of the ball-milled mixtures is as shown in curve b of FIG. 11, from which it can be seen that the peaks appeared at 2200 to 2400 $cm^{-1}$ and 1125 $cm^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 76.5% by iodometric analysis.

Embodiment 27

Preparation of lithium borohydride through solid-phase ball milling at room temperature, the procedures of which are given below:

At room temperature, in a glovebox filled with argon atmosphere of 0.1 MPa, $MgH_2$ and $LiBO_2 \cdot 2H_2O$ (at a molar ratio of 5:1) are mixed, loaded into a ball milling jar which can be well sealed. The ball milling process is then conducted on a high energy vibrational ball mill (QM-3C), for which the ratio of ball-to-powder is 50:1, the rotating speed is 1200 rpm, and the time is 15 h. The milling process is carried out by alternating 30 min of milling and 30 min of rest.

FTIR spectra of the ball-milled mixtures is as shown in curve c of FIG. 11, from which it can be seen that the peaks appeared at 2200 to 2400 $cm^{-1}$ and 1125 $cm^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 67.5% by iodometric analysis.

Embodiment 28

Preparation of lithium borohydride through solid-phase ball milling at room temperature, the procedures of which are given below:

At room temperature, in a glovebox filled with argon atmosphere of 0.1 MPa, $MgH_2$ and $LiBO_2 \cdot 2H_2O$ (at a molar ratio of 5.5:1) are mixed, loaded into a ball milling jar which can be well sealed. The ball milling process is then conducted on a high energy vibrational ball mill (QM-3C), for which the ratio of ball-to-powder is 50:1, the rotating speed is 1200 rpm, and the time is 5 h. The milling process is carried out by alternating 30 min of milling and 30 min of rest.

It is demonstrated that there is lithium borohydride generated from the analysis on FTIR results of the ball-milled mixtures;

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 74.6% by iodometric analysis.

Embodiment 29

Preparation of lithium borohydride through solid-phase ball milling at room temperature, the procedures of which are given below:

At room temperature, in a glovebox filled with argon atmosphere of 0.1 MPa, $MgH_2$ and $LiBO_2 \cdot 2H_2O$ (at a molar ratio of 5.5:1) are mixed, loaded into a ball milling jar which can be well sealed. The ball milling process is then conducted on a high energy vibrational ball mill (QM-3C), for which the ratio of ball-to-powder is 50:1, the rotating speed is 1200 rpm, and the time is 10 h. The milling process is carried out by alternating 30 min of milling and 30 min of rest.

It is demonstrated that there is lithium borohydride generated from the analysis on FTIR results of the ball-milled mixtures;

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 68.3% by iodometric analysis.

Embodiment 30

Preparation of lithium borohydride through solid-phase ball milling at room temperature, the procedures of which are given below:

At room temperature, in a glovebox filled with argon atmosphere of 0.1 MPa, $MgH_2$ and $LiBO_2 \cdot 2H_2O$ (at a molar ratio of 5.5:1) are mixed, loaded into a ball milling jar which can be well sealed. The ball milling process is then conducted on a high energy vibrational ball mill (QM-3C), for which the ratio of ball-to-powder is 50:1, the rotating speed is 1200 rpm, and the time is 15 h. The milling process is carried out by alternating 30 min of milling and 30 min of rest.

It is demonstrated that there is lithium borohydride generated from the analysis on FTIR results of the ball-milled mixtures;

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 61.5% by iodometric analysis.

Embodiment 31

Preparation of lithium borohydride through solid-phase ball milling at room temperature, the procedures of which are given below:

At room temperature, in a glovebox filled with argon atmosphere of 0.1 MPa, magnesium and anhydrous lithium metaborate (at a molar ratio of 2:1) are mixed, loaded into a ventilated ball milling jar which is filled with 3 MPa of hydrogen after evacuation. The ball milling process is then conducted on a high energy vibrational ball mill (QM-3C) under $H_2$ atmosphere, for which the ratio of ball-to-powder is 50:1, the rotating speed is 1200 rpm, and the time is 10 h. The milling process is carried out by alternating 30 min of milling and 30 min of rest.

Figure 12:
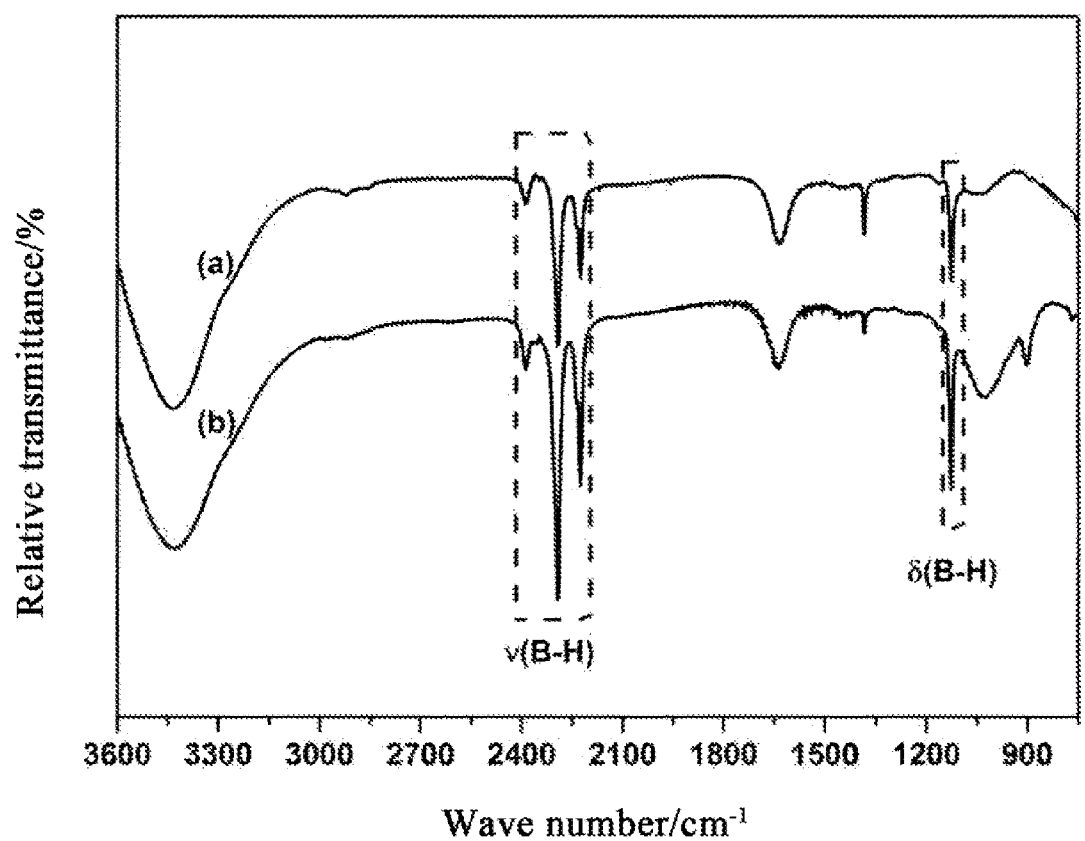
FIG. 12 shows FTIR spectra of the ball-milled mixtures of magnesium and anhydrous lithium metaborate under $H_2$ atmosphere in Embodiment 31 and FTIR spectra of the ball-milled mixture of aluminum magnesium and lithium metaborate dihydrate in Embodiment 32, wherein, each curve refers to a corresponding embodiment, respectively: a—Embodiment 32, b—Embodiment 31.

FTIR spectra of the ball-milled mixtures is as shown in curve b of FIG. 12, from which it can be seen that the strong vibration peaks appeared at 2200 to 2400 $cm^{-1}$ and 1125 $cm^{-1}$ correspond to the absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 48.1% by iodometric analysis.

Embodiment 32

Preparation of lithium borohydride through solid-phase ball milling at room temperature, the procedures of which are given below:

At room temperature, in a glovebox filled with argon atmosphere of 0.1 MPa, magnesium aluminum alloy ($Mg_{17}Al_{12}$) and lithium metaborate dihydrate (at a molar ratio of 4:17) are mixed, loaded into a ball milling jar which can be well sealed. The ball milling process is then conducted on a high energy vibrational ball mill (QM-3C), for which the ratio of ball-to-powder is 50:1, the rotating speed is 1200 rpm, and the time is 10 h. The milling process is carried out by alternating 30 min of milling and 30 min of rest.

FTIR spectra of the ball-milled mixtures is as shown in curve a of FIG. 12, from which it can be seen that the vibration peaks appeared at 2200 to 2400 $cm^{-1}$ and 1125 $cm^{-1}$ correspond to the vibration absorption peaks of B—H bond, demonstrating the generation of lithium borohydride.

The ball-milled mixtures are dissolved and extracted with diethyl ether, and filtered to gain a clear filtrate; the colatuie is evaporated under high vacuum to obtain a white powder, which is identified to be highly pure $LiBH_4$ over XRD analysis, and the yield is quantitatively calculated to be 34.2% by iodometric analysis.

Embodiment 33

Preparation of lithium borohydride through solid-phase ball milling at room temperature, the procedures of which are given below:

At room temperature, in a glovebox filled with argon atmosphere of 0.1 MPa, magnesium silicide ($Mg_2Si$) and lithium metaborate dihydrate (at a molar ratio of 2.5:1) are mixed, loaded into a ball milling jar which can be well sealed. The ball milling process is then conducted on a high energy vibrational ball mill (QM-3C), for which the ratio of ball-to-powder is 50:1, the rotating speed is 1200 rpm, and the time is 10 h. The milling process is carried out by alternating 30 min of milling and 30 min of rest.

Figure 13:
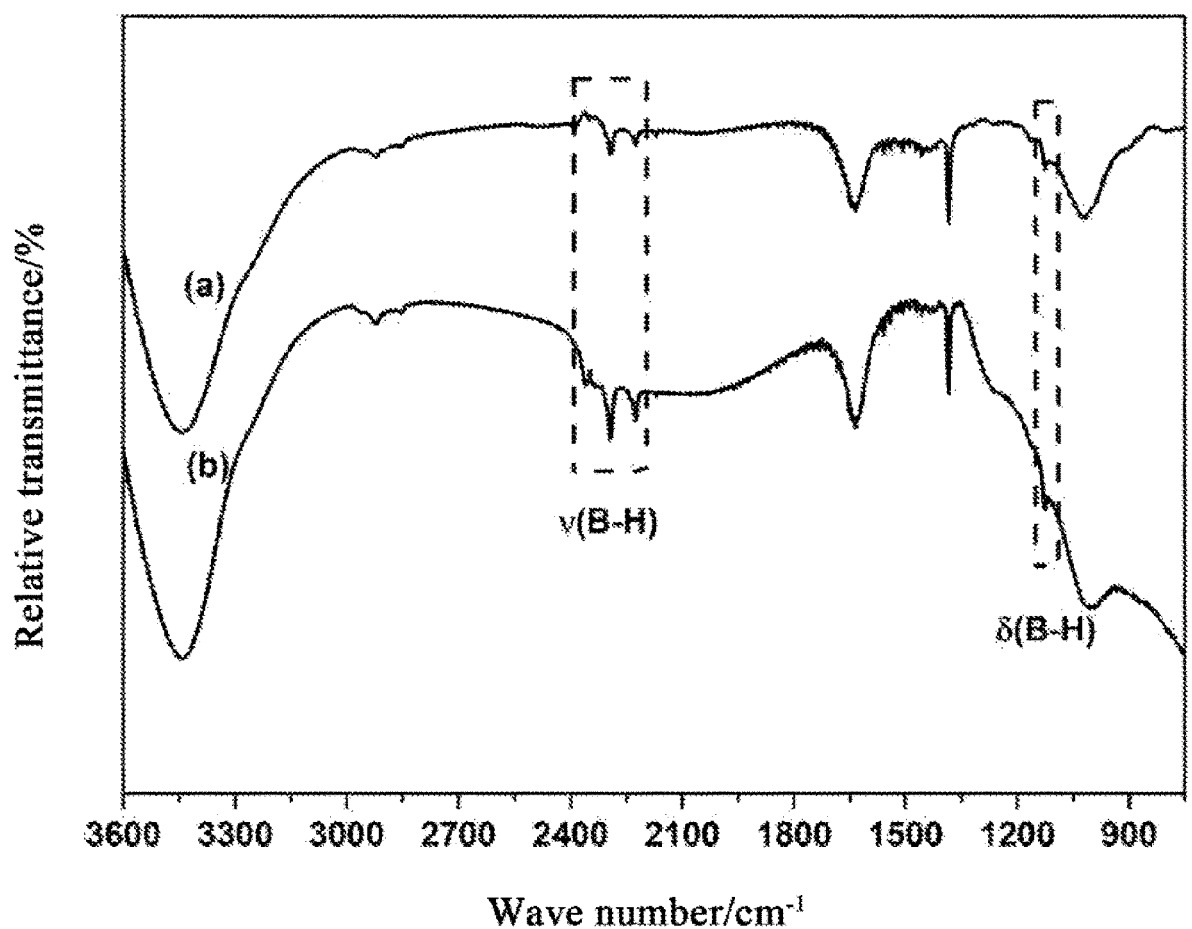
FIG. 13 shows FTIR spectra of the ball-milled mixtures of magnesium silicide and calcium magnesium with lithium metaborate dihydrate in Embodiments 33 to 34, wherein, each curve refers to a corresponding embodiment, respectively: a—Embodiment 33, b—Embodiment 34.

FTIR spectra of the ball-milled mixtures is as shown in curve a of FIG. 13, from which it can be seen that the weak vibration peaks appeared at 2200 to 2400 $cm^{-1}$ and 1125 $cm^{-1}$ correspond to the absorption peaks of B—H bond, demonstrating the generation of lithium borohydride.

Embodiment 34

Preparation of lithium borohydride through solid-phase ball milling at room temperature, the procedures of which are given below:

At room temperature, in a glovebox filled with argon atmosphere of 0.1 MPa, calcium magnesium ($CaMg_2$) and lithium metaborate dihydrate (at a molar ratio of 5:3) are mixed, loaded into a ball milling jar which can be well sealed. The ball milling process is then conducted on a high energy vibrational ball mill (QM-3C), for which the ratio of ball-to-powder is 50:1, the rotating speed is 1200 rpm, and the time is 10 h. The milling process is carried out by alternating 30 min of milling and 30 min of rest.

FTIR spectra of the ball-milled mixtures is as shown in curve b of FIG. 13, from which it can be seen that the vibration peaks appeared at 2200 to 2400 $cm^{-1}$ and 1125 $cm^{-1}$ correspond to the vibration absorption peaks of B—H bond, demonstrating the generation of lithium borohydride.

The aforementioned embodiments are preferred implementations of the invention, but the implementations of the invention are not limited to these embodiments. Any other changes, modifications, replacements, combinations, simplifications made to the invention without departing from its spirit and principle all should be considered as equivalent substitutions and comprised in the protection scope of the invention.

What is claimed is:

1. A method for preparing lithium borohydride by means of solid-phase ball milling at room temperature, comprising the following steps:
under room temperature and non-oxidizing atmosphere, solid-phase ball milling, separating, and purifying uniformly mixed magnesium-containing reducing agent and a lithium metaborate-based material to obtain the lithium borohydride ($LiBH_4$);
wherein the magnesium-containing reducing agent is one or more selected from the group consisting of magnesium, aluminum magnesium and calcium magnesium alloys;
the lithium metaborate-based material is composed of both hydrous lithium metaborate and anhydrous lithium metaborate, or the lithium metaborate-based material is hydrous lithium metaborate; and
the non-oxidizing atmosphere is an argon atmosphere or a mixed atmosphere of argon and hydrogen; the non-oxidizing atmosphere holds a pressure of 0-3 MPa.

2. The method of claim 1, wherein the lithium metaborate-based material is hydrous lithium metaborate; wherein the hydrous lithium metaborate comprises $LiBO_2 \cdot 2H_2O$, $LiBO_2 \cdot 8H_2O$ or $LiBO_2 \cdot 1/2H_2O$.

3. The method of claim 1, wherein a mixing ratio of the magnesium-containing reducing agent to the lithium metaborate-based material is determined by:

$$(n_1+1.5n_2+n_3):x=(1:1) \sim (2.5:1)$$

wherein $n_1 \geq 0$, $n_2 \geq 0$, $n_3 \geq 0$,
wherein a mole number of magnesium is $n_1$, a mole number of aluminum is $n_2$, a mole number of calcium is $n_3$ in the magnesium-containing reducing agent; wherein $n_1 \geq 0$, $n_2 \geq 0$, $n_3 \geq 0$;
wherein $x=2$ or $4$,
wherein a mole number of oxygen is $x$ in the lithium metaborate-based material.

4. The method of claim 1, wherein the ratio of ball-to-powder for the solid-phase ball milling is 10:1 to 70:1.

5. The method of claim 1, wherein the rotating speed for the solid-phase ball milling is 1000 to 1200 rpm, and the ball milling time is from 1 h to 30 h.

6. The method of claim 1, wherein the separating and purifying comprise dissolving the ball-milled mixtures in a solvent, filtering for removing insoluble residues, and evaporating the obtained clear filtrate under high vacuum;
wherein the solvent is diethyl ether which is distilled over Na.

* * * * *